(12) United States Patent
Mukai et al.

(10) Patent No.: US 9,182,478 B2
(45) Date of Patent: Nov. 10, 2015

(54) RADAR DEVICE

(75) Inventors: Hirohito Mukai, Tokyo (JP); Takaaki Kishigami, Tokyo (JP); Yoichi Nakagawa, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 225 days.

(21) Appl. No.: 13/818,194

(22) PCT Filed: Sep. 12, 2011

(86) PCT No.: PCT/JP2011/005114
§ 371 (c)(1),
(2), (4) Date: Feb. 21, 2013

(87) PCT Pub. No.: WO2012/035743
PCT Pub. Date: Mar. 22, 2012

(65) Prior Publication Data
US 2013/0162465 A1    Jun. 27, 2013

(30) Foreign Application Priority Data

Sep. 14, 2010  (JP) ................................. 2010-205420

(51) Int. Cl.
*G01S 13/10* (2006.01)
*G01S 7/292* (2006.01)
(Continued)

(52) U.S. Cl.
CPC ............... *G01S 13/103* (2013.01); *G01S 7/282* (2013.01); *G01S 7/285* (2013.01); *G01S 7/292* (2013.01); *G01S 13/106* (2013.01)

(58) Field of Classification Search
CPC ............ G01S 7/02; G01S 7/28; G01S 7/282; G01S 7/285; G01S 7/292; G01S 13/02; G01S 13/06; G01S 13/08; G01S 13/10; G01S 13/103; G01S 13/106; G01S 13/12

USPC ............... 342/27, 28, 82–103, 118, 134–145, 342/175, 195, 196, 202–204; 705/1.1
See application file for complete search history.

(56) References Cited

U.S. PATENT DOCUMENTS 4,042,925 A * 8/1977 Albanese et al. ............. 342/196
4,123,755 A * 10/1978 Fishbein et al. .............. 342/203
(Continued)

FOREIGN PATENT DOCUMENTS

CN    101464517 A    6/2009
JP    05-048648 B2    7/1993
(Continued)

OTHER PUBLICATIONS

International Search Report, mailed Nov. 15, 2011, for International Application No. PCT/JP2011/005114, 4 pages.

*Primary Examiner* — Bernarr Gregory
(74) *Attorney, Agent, or Firm* — Seed IP Law Group PLLC

(57) ABSTRACT

A radar device includes a signal generator that generates an intermittent signal having a prescribed signal width and signal interval, a transmission signal position adjuster that outputs a transmission signal while adjusting positions of the intermittent signal on the time axis, an RF transmitter that transmits the transmission signal, an RF receiver that receives a reception signal including reflection waves reflected from an object in a measurement subject space, an AD converter that converts the reception signal into a digital signal, and an object detector that detects the object based on the reception signal. The transmission signal position adjuster outputs a transmission signal in which positions of respective signal units of the intermittent signal on the time axis are adjusted in units of a time adjustment amount that is shorter than a sampling interval of the AD converter.

9 Claims, 13 Drawing Sheets

(51) Int. Cl.
*G01S 7/282* (2006.01)
*G01S 7/285* (2006.01)
*G01S 13/00* (2006.01)

(56) References Cited

U.S. PATENT DOCUMENTS

| | | | | |
|---|---|---|---|---|
| 5,519,400 | A | * | 5/1996 | McEwan ........................ 342/28 |
| 5,552,878 | A | * | 9/1996 | Dillard ......................... 342/135 |
| 6,111,536 | A | * | 8/2000 | Richards et al. ............. 342/118 |
| 7,158,077 | B2 | * | 1/2007 | Brosche ....................... 342/137 |
| 7,295,152 | B2 | * | 11/2007 | Shima ............................ 342/88 |
| 7,605,744 | B1 | * | 10/2009 | Karhunen et al. ............ 342/137 |
| 7,612,709 | B2 | * | 11/2009 | Kawano et al. .............. 342/135 |
| 7,612,711 | B1 | * | 11/2009 | McIntire et al. ............. 342/195 |
| 7,714,777 | B2 | * | 5/2010 | Fukuda ........................ 342/175 |
| 7,925,515 | B2 | * | 4/2011 | Xu et al. ........................ 705/1.1 |
| 7,973,703 | B2 | * | 7/2011 | Burri et al. ................... 342/175 |
| 7,978,610 | B1 | * | 7/2011 | McIntire et al. ............. 342/118 |
| 8,115,672 | B2 | * | 2/2012 | Nouvel et al. ................ 342/118 |
| 2007/0109175 | A1 | * | 5/2007 | Fukuda .......................... 342/82 |
| 2009/0009384 | A1 | | 1/2009 | Kawano et al. | |
| 2009/0195438 | A1 | | 8/2009 | Kawai | |
| 2010/0190831 | A1 | | 7/2010 | Shi et al. | |

FOREIGN PATENT DOCUMENTS

| | | |
|---|---|---|
| JP | 05-180930 A | 7/1993 |
| JP | 11-023695 A | 1/1999 |
| JP | 2000-338226 A | 12/2000 |
| JP | 2006274871 A | 10/2006 |
| JP | 2008-160545 A | 7/2008 |
| WO | 2007083355 A1 | 7/2007 |

* cited by examiner

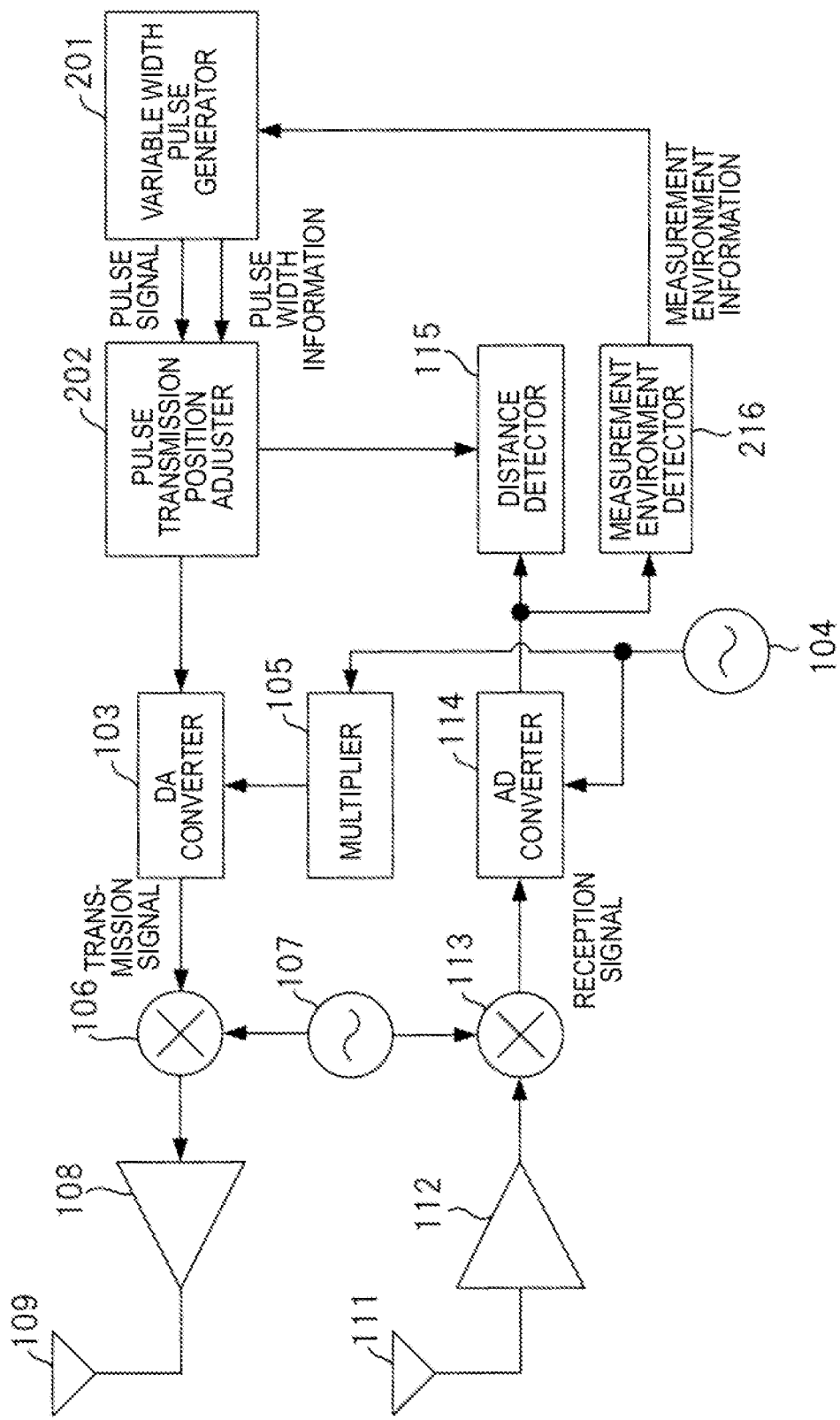

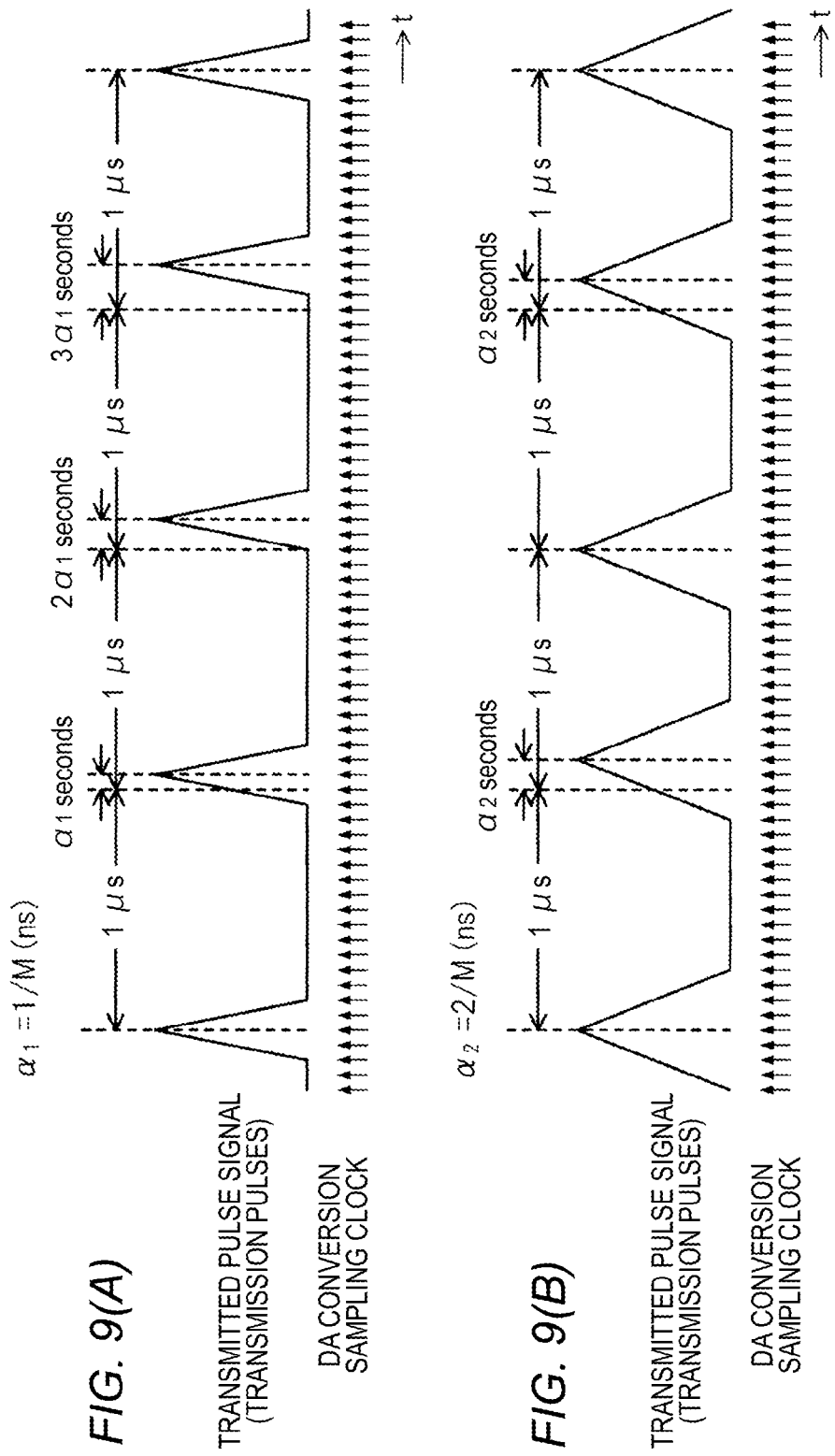

RADAR DEVICE

BACKGROUND

1. Technical Field

The present invention relates to a radar device which uses a radio frequency signal.

2. Description of the Related Art

In recent years, techniques for determining a position with high accuracy have come to attract attention in such fields as security, logistics, and ITS (Intelligent Transport Systems). And radar technologies using a high-frequency radio signal have been developed as position determining methods. An FMCW (frequency-modulated continuous wave) radar technology, a pulse radar technology, etc. are known as radar technologies of the above kind.

In FMCW radars, a distance to a reflective object is determined by transmitting a transmission signal while varying the frequency of a carrier signal and performing a frequency analysis on a reception signal that is reflected from the reflective object and received by the radar. A pulse radar technique is a technique in which a distance to a reflective object is measured by transmitting a pulse signal having a short duration as a transmission signal and detecting a time to reception, by the radar, of the transmission signal reflected by the reflective object.

Pulse radars will be described below. In pulse radars, a pulse signal transmitted from a radar is reflected by various objects existing in the space and hence reflection waves coming from various directions and having various delay times are received by the radar as incoming waves. This kind of environment is called a multipath environment. In a multipath environment, if two incoming wave signals have delay times that are shorter than a pulse width, reception pulses of these incoming wave signals overlap with each other and hence it is difficult to separate the two incoming wave signals.

As in understood from the above description, the separation resolution of two incoming wave signals is determined by the pulse width of a pulse signal. Therefore, as the pulse width is shortened, the separation resolution increases and the degree of degradation due to a multipath environment can be lowered. Thus, to realize a high separation resolution for high-accuracy position determination, it is required to shorten the pulse width.

To shorten the pulse width, it is necessary to deal with wideband signals. This necessitates wideband analog circuits or high-speed digital circuits in a signal processing section of each of a transmitter and a receiver. In particular, it is necessary to increase the processing speed of an AD conversion circuit which converts an analog signal into a digital signal or a DA conversion circuit which performs opposite processing, that is, converts a digital signal into an analog signal.

In sampling for converting an analog signal into a digital signal, to satisfy the sampling theorem, it is necessary to sample a sampling subject signal with a bandwidth that is two times or more as broad as its bandwidth. Therefore, to narrow the pulse width for the purpose of increasing the accuracy of a radar, it is necessary to perform sampling at shorter intervals accordingly.

PRIOR ART DOCUMENTS

Patent Documents

Patent document 1: JP-B-5-48648
Patent document 2: JP-A-2008-160545

BRIEF SUMMARY

Problems to be Solved by the Invention

As described above, to increase the separation resolution of a pulse radar, it is necessary to shorten the pulse width of a pulse signal that is used as a transmission signal. To shorten the pulse width of a pulse signal, it is necessary to increase the processing speed of an AD conversion circuit and a DA conversion circuit of a signal processing section.

Whereas a DA converter capable of high-speed operation can be implemented relatively easily, current AD conversion circuits are closer to a limit of processing speed than current DA conversion circuits. Therefore, the separation resolution, a fundamental property, of a radar is restricted by the sampling cycle of an AD conversion circuit. Therefore, to realize a higher separation resolution, a method for realizing a sampling resolution that is higher than the sampling resolution (device property) of an AD conversion circuit is necessary.

There are several known methods for acquiring a digital signal at a resolution that is higher than the frequency of a sampling clack (sampling frequency), that is, at an interval that is shorter than an AD conversion sampling interval, without increasing the sampling rate of an AD conversion circuit. A first method is a method typically employed in sampling oscilloscopes. In this method, measurements are performed in such a manner that sampling is performed while the timing of a sampling clock of an AD conversion circuit is varied (refer to Patent document 1).

The first method makes it possible to convert a signal that varies faster than the sampling clock of the AD conversion circuit into digital values by performing measurements while varying the AD conversion timing gradually and rearranging resulting data.

Measurement signals that are assumed in sampling oscilloscopes are periodic signals. However, to shift the AD conversion sampling timing, it is necessary to correctly control a clock signal that is input to the AD conversion circuit. This raises a problem that a control circuit and a clock generation circuit become complex in configuration.

In a second method, plural AD conversion circuits are used and sampling is performed in such a manner that the sampling timing is shifted from one AD conversion circuit to another little by little (refer to Patent document 2). This method makes it possible to sample, at a sufficiently high resolution, a signal that varies at a higher rate than the sampling frequency of the individual AD conversion circuits.

Patent document 2 has a statement to the effect that the distance resolution of a radar can be increased by sampling a signal that varies at a higher rate than a sampling frequency using plural AD conversion circuits. However, in this method, the use of plural AD conversion circuits increases the circuit scale. Furthermore, a circuit is necessary which continues to give constant delays correctly to plural branch sampling clocks produced from a single sampling clock. This raises problems that a complicated control is necessary and the circuit scale is increased.

The present invention has been made in the above circumstances, and an object of the present invention is to make it possible to acquire a digital signal at an interval that is shorter than the sampling interval of an AD conversion circuit and to thereby increase the distance resolution of a radar device without making the AD conversion circuit and its peripheral circuits complex in configuration.

Means for Solving the Problems

The invention provides a radar device comprising a signal generator for generating an intermittent signal having a prescribed signal width and signal interval; a transmission signal position adjuster for outputting a transmission signal while adjusting positions of the intermittent signal on the time axis; an RF transmitter for transmitting the transmission signal to a measurement subject space in the form of radio waves; an RF receiver for receiving, from the measurement subject space, a reception signal including reflection waves reflected from an object in the measurement subject space; an AD converter for converting the reception signal into a digital signal; and an object detector for detecting the object on the basis of the reception signal, wherein the transmission signal position adjuster outputs a transmission signal in which positions of respective signal units of the intermittent signal on the time axis are adjusted in units of a time adjustment amount that is shorter than a sampling interval of the AD converter.

The above configuration makes it possible to shift the reception timing of signal units of a reception signal from the sampling timing of the AD conversion of the receiving side. Therefore, in this radar device, a reception signal can be sampled at an interval that is shorter than the sampling interval of the AD conversion and the distance resolution is thereby increased without making the AD conversion circuit and its peripheral circuits complex in configuration.

Advantageous Effects of the Invention

The invention makes it possible to acquire a digital signal at an interval that is shorter than the sampling interval of an AD conversion circuit and to thereby increase the distance resolution of a radar device without making the AD conversion circuit and its peripheral circuits complex in configuration.

BRIEF DESCRIPTION OF THE SEVERAL VIEWS OF THE DRAWINGS

FIG. 7 is a block diagram showing the configuration of a radar device according to a second embodiment of the invention.

FIGS. 9(A) and 9(B) are operation explanation diagrams showing example pulse signals (transmission pulses) each of which is output from a pulse transmission position adjuster used in the second embodiment.

DETAILED DESCRIPTION

Example configurations of radar devices and how they operate will be hereinafter described as embodiments of the present invention. Configurations in a case of using a wide-band pulse signal as a transmission signal to increase the resolution of a radar device will be described in the embodiments.

Embodiment 1

In a first embodiment, the transmission side generates, for each pulse of a generated pulse signal, a transmission signal pulse whose transmission position is adjusted, that is, whose timing is shifted, by a time that is shorter than the sampling interval of AD conversion performed on the reception side, and transmits such a transmission signal pulse repeatedly.

This makes it possible to shift the timing of each pulse of a pulse signal from the sampling timing of AD conversion performed on the reception side. Therefore, it becomes possible to sample a reception signal at an interval that is shorter than the AD conversion sampling interval without the need for taking such a measure as increasing the sampling frequency of an AD conversion circuit or adding peripheral circuits of an AD conversion circuit. The distance resolution is thus increased.

Figure 1:
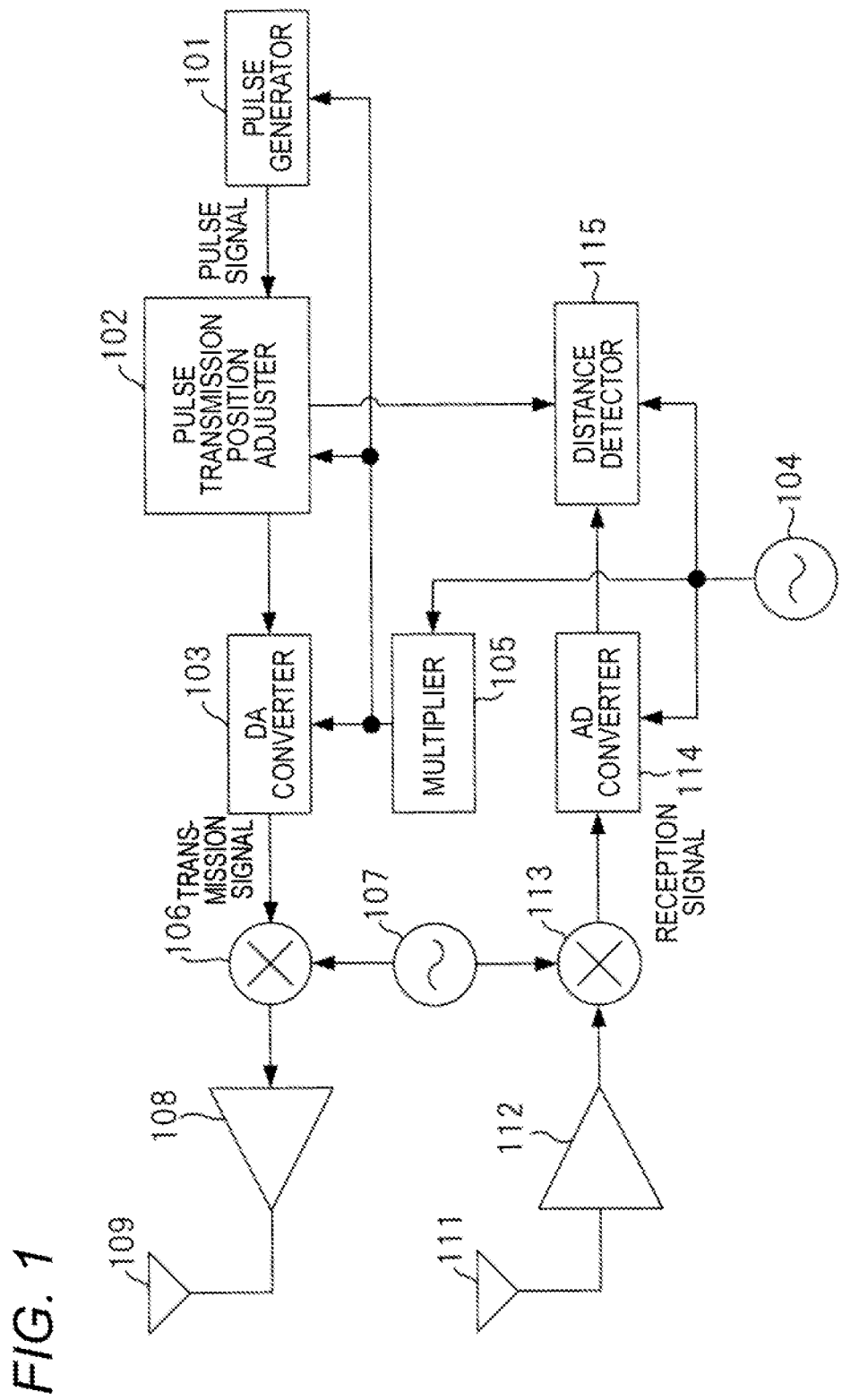
FIG. 1 is a block diagram showing the configuration of a radar device according to a first embodiment of the present invention.

FIG. 1 is a block diagram showing the configuration of a radar device according to the first embodiment of the invention. The radar device includes, as a transmitter, a pulse generator 101, a pulse transmission position adjuster 102, a DA converter 103, a sampling clock generator 104, a multiplier 105, a transmission mixer 106, a local signal generator 107, an amplifier 108, and an antenna 109. The radar device includes, as a receiver, an antenna 111, an amplifier 112, a reception mixer 113, an AD converter 114, and a distance detector 115. The sampling clock generator 104 and the local signal generator 107 are shared by the transmitter and the receiver.

The transmission mixer 106, the amplifier 108, and the antenna 109 are example blocks for implementing the function of an RF transmitter. And the antenna 111, the amplifier 112, and the reception mixer 113 are example blocks for implementing the function of an RF receiver.

The pulse generator 101, which is an example block for implementing the function of a signal generator, repeatedly generates and outputs a pulse having a prescribed pulse width at a constant time interval. The generated pulse signal (generated pulses) is input to the pulse transmission position adjuster 102.

The pulse transmission position adjuster 102 is an example block for implementing the function of a transmission signal position adjuster. For the pulses, having the constant interval, of the pulse signal that is output from the pulse generator 101, the pulse transmission position adjuster 102 adjusts the transmission timing (pulse transmission position) of each pulse by a time adjustment amount that is shorter than the sampling interval of the AD converter 114 of the receiver.

In the above adjustment, the transmission timing of each pulse (each signal unit which is a pulse) of the pulse signal is delayed or advanced. A delay time control method in the case of delaying the pulse signal will be described later. The transmission-timing-varied pulse signal (transmission pulses) is input to the DA converter 103 as a transmission signal. The pulse transmission position adjuster 102 outputs a pulse transmission position signal indicating the transmission timing (pulse transmission positions) of the pulse signal to the distance detector 115 of the receiver.

The sampling clock generator 104 generates a sampling clock for the AD converter 114 of the receiver. The generated sampling clock is input to the AD converter 114 and the multiplier 105. The sampling dock is also input to the distance detector 115 of the receiver. In this case, the circuit of the distance detector 115 is caused to operate according to the same dock as the sampling clock for the AD converter 114.

In general, the distance detector 115 is implemented as an FPGA, an LSI, or the like. Where a high-rate sampling clock is used as in this embodiment, it may vary too fast for use as an operation dock of the FPGA or LSI. In such a case, it is possible to generate different frequencies from a clock of a common oscillation source and set the rates of an operation clock of the FPGA or LSI and a clock of the AD conversion circuit low and high, respectively.

To generate a sampling clock for the DA converter 103 of the transmitter, the multiplier 105 multiplies the sampling clock that is input from the sampling clock generator 104. A multiplication factor which is used in this processing will be described later. The multiplied sampling clock is input to the DA converter 103. The multiplied sampling clock is also input to the pulse transmission position adjuster 102 and the pulse generator 101. In this case, the circuits of the pulse transmission position adjuster 102 and the pulse generator 101 are caused to operate according to the same clock as the sampling clock for the DA converter 103.

In general, each of the pulse transmission position adjuster 102 and the pulse generator 101 is implemented as an FPGA, an LSI, or the like. Where a high-rate sampling dock is used as in this embodiment, it may vary too fast for use as an operation clock of the FPGA or LSI. In such a case, it is possible to generate different frequencies from a clock of a common oscillation source and set the rates of an operation clock of the FPGA or LSI and a clock of the DA conversion circuit low and high, respectively.

The DA converter 103 receives the pulse signal that is output from the pulse transmission position adjuster 102 and the multiplied sampling clock that is output from the multiplier 105. The DA converter 103 converts the pulse signal from the digital signal into an analog signal according to the timing of the multiplied sampling dock. The converted pulse signal (analog signal) is input to the transmission mixer 106 as a transmission signal.

The local signal generator 107, which has a local oscillator, generates a local signal to be used for up-converting a baseband signal into an RF signal. The generated local signal is input to the transmission mixer 106. The local signal is also input to the reception mixer 113 of the receiver.

The transmission mixer 106, which has a mixer etc., receives the converted pulse signal (analog signal) from the DA converter 103 and receives the local signal from the local signal generator 107. The transmission mixer 106 mixes the received pulse signal and local signal together and thereby up-converts the pulse signal which is in a baseband into an RF signal having a radio frequency. The up-converted pulse signal is input to the amplifier 108.

The amplifier 108 amplifies an up-converted transmission signal (radio signal) having the radio frequency. The amplified radio signal is transmitted, that is, emitted to a measurement subject space, from the transmission antenna 109. If an object exists in the measurement subject space, the signal transmitted from the antenna 109 of the radar device is reflected by the object and a signal of resulting reflection waves is received by the reception antenna 111. The transmission antenna and the reception antenna may be implemented as a common antenna.

The radio signal received by the antenna 111 of the radar device is input to the amplifier 112. The amplifier 112 amplifies a reception signal of the radio signal received by the antenna 111. The reception signal includes the signal of the reflection waves coming from the object. The reception signal amplified by the amplifier 112 is input to the reception mixer 113.

The reception mixer 113, which has a mixer, receives the output signal of the amplifier 112 and the local signal that is output from the local signal generator 107. The reception mixer 113 mixes the received reception signal and local signal together and thereby down-converts the reception signal (RF signal) having the radio frequency into a baseband signal. The down-converted reception signal is input to the AD converter 114.

Although the architecture of the high-frequency part of the radar device according to the embodiment is of a direct conversion type in which an RF signal is directly converted into a baseband signal, the invention is not limited to such a case. For example, an architecture using an IF such as a superheterodyne architecture may be employed.

In the description of the configuration of the radar device according to the embodiment, a filter for bandwidth restriction, prevention of extraneous emissions, or the like and such circuits as a variable amplifier are omitted to simplify the description.

The AD converter 114 receives the reception signal as down-converted into the baseband signal and the sampling clock that is output from the sampling clock generator 104. The AD converter 114 converts the reception signal from the analog signal into a digital signal according to the timing of the sampling clock. The reception signal as converted into the digital signal is input to the distance detector 115.

The distance detector 115 is an example block for implementing the function of an object detector. The distance detector 115 receives the reception signal as converted into the digital signal and the pulse transmission position signal that is output from the pulse transmission position adjuster 102. The distance detector 115 performs reception signal wave detection processing, pulse detection processing, and distance detection processing and thereby calculates a distance to the object. The pulse detection processing, which is processing of detecting pulses (reception pulses) of the reflection waves coming from the object, detects pulse components in the reception signal using a comparator etc.

The distance detection processing, which is processing of detecting a distance to the object that has produced the reflection waves, calculates a time from the transmission of a pulse of the pulse signal to the detection of a reception pulse of the reflection waves using the pulse transmission position signal and converts it into a distance to the object. The distance detector 115 outputs the calculated distance information to a downstream information processor, a display, etc. Using the distance information, the information processor can perform various kinds of information processing relating to the detected object and the display can display the distance information.

Figure 2:
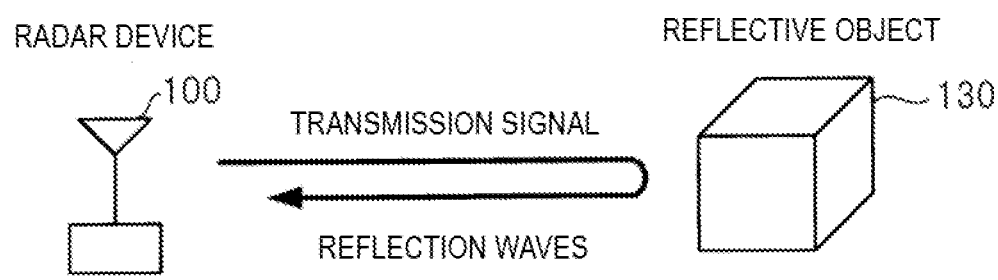
FIG. 2 illustrates a use environment of the radar device according to the first embodiment.

FIG. 2 illustrates a use environment of the radar device according to the embodiment. The radar device 100 and a reflective object 130 exist in an assumed radar use environment. A transmission signal that is transmitted from the radar device 100 is reflected by the reflective object 130 and resulting reflection waves are received by the radar device 100.

In the embodiment, a transmission signal pulse is transmitted repeatedly while the pulse transmission position adjuster 102 shifts the transmission timing (pulse transmission position) of a pulse signal by a time that is shorter than the reception signal sampling interval of the AD converter 114 of the receiver. As a result, pseudo oversampling is realized and a reception signal can be AD-converted at an interval that is shorter than the sampling interval of the AD conversion circuit. The reflection wave separation resolution is thus increased.

Figure 3:
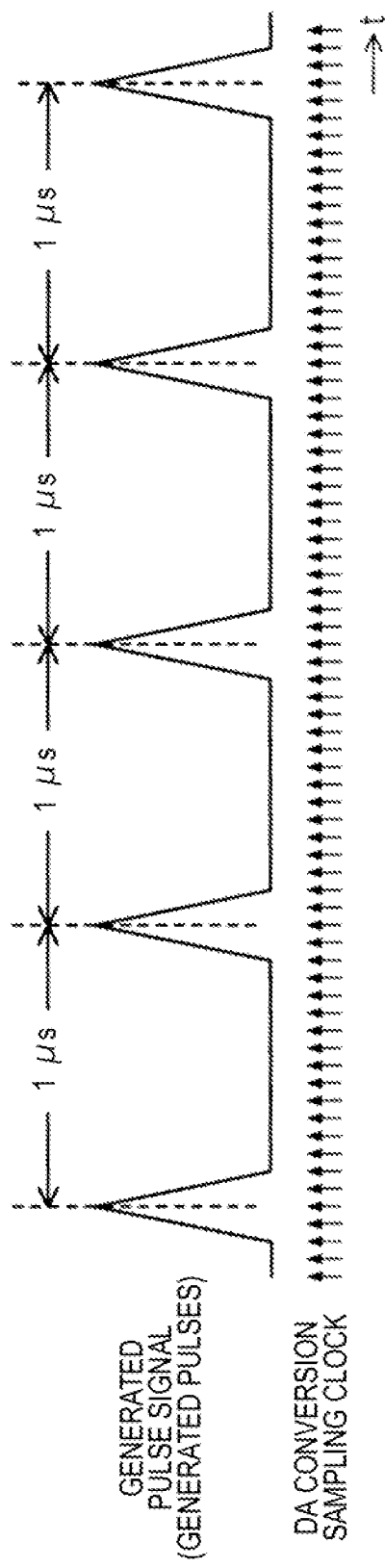
FIG. 3 is an operation explanation diagram showing an example pulse signal (generated pulses) that is output from a pulse generator used in the first embodiment.

FIG. 3 is an operation explanation diagram showing an example pulse signal (generated pulses) that is output from the pulse generator 101 used in the first embodiment. The pulse generator 101 generates and outputs a pulse repeatedly at a constant cycle. The arrows shown in the figure indicate the timing of a sampling clock (DA conversion sampling clock) of the DA converter 103. Although in the example of FIG. 3 the pulse generation cycle (pulse repetition interval) is equal to 1 µs, the invention is not limited to such a case.

As for the relationship between the sampling dock of the DA converter 103 and the generated pulse signal, as shown in FIG. 3, the interval of the DA conversion sampling clock is 1/N of the pulse width of the pulse signal. Although in the embodiment N is set at 4, the invention is not limited to such a case. A pulse width value is not shown in the figure. Although in this example the pulse width is assumed to be 1 ns, the invention is not limited to such a case. The pulse width of 1 ns corresponds to a separation resolution of about 30 cm.

Where a pulse signal is used as a transmission signal, the pulse transmission interval (pulse generation cycle) determines a maximum detection distance that can be measured by a radar. That is, the pulse transmission interval is set to a time (time interval) that is longer than a time that is taken from transmission of a pulse from a radar device to reception, by the radar device, of a pulse that is reflected from an object having an assumed maximum detection distance. On the other hand, the pulse width of a pulse signal determines a separation resolution of reflection waves coming from an object. As the pulse width decreases, the separable distance of reflection waves coming from an object becomes shorter and the resolution increases.

Although in the embodiment a single pulse having a prescribed width is transmitted repeatedly as a transmission signal, the invention is not limited to such a case as long as the transmission signal is an intermittent signal having a prescribed signal width and interval. For example, transmission signal may be a modulated signal obtained by frequency-modulating or phase-modulating a pulse signal. That is, although in the embodiment the intermittent signal is a pulse signal and its signal unit is a single pulse, the invention is not limited to such a case.

Figure 4:
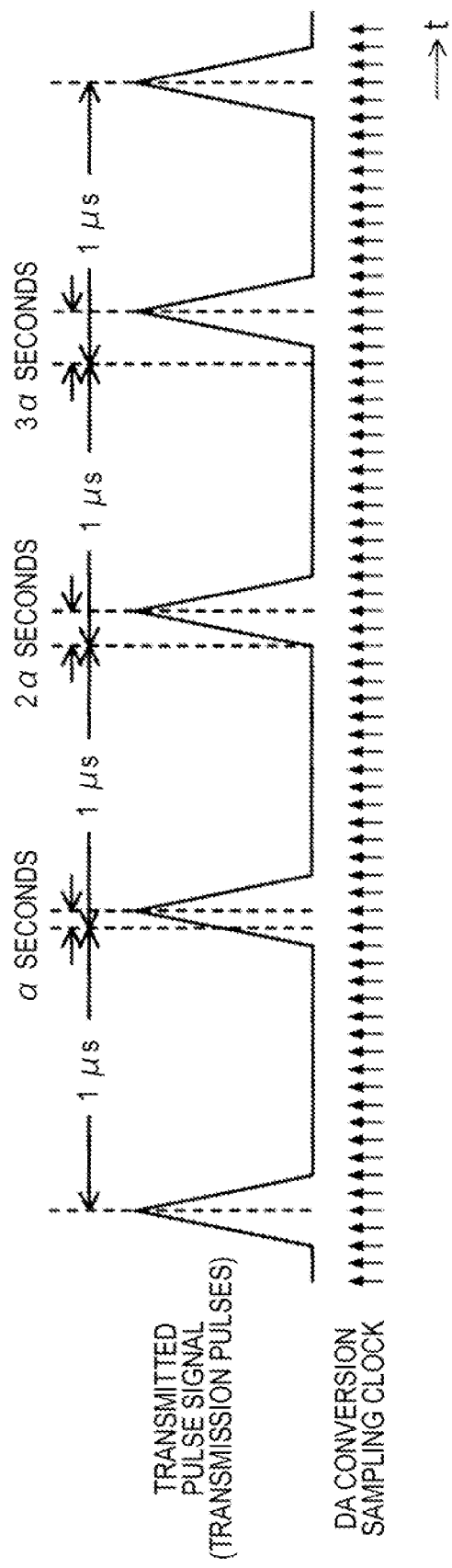
FIG. 4 is an operation explanation diagram showing an example pulse signal (transmission pulses) that is output from a pulse transmission position adjuster used in the first embodiment.

FIG. 4 is an operation explanation diagram showing an example pulse signal (transmission pulses) that is output from the pulse transmission position adjuster 102 used in the embodiment. The pulse transmission position adjuster 102 varies the pulse positions of a received pulse signal and thereby adjusts the transmission timing (pulse transmission positions) of a pulse signal. The input signal is a pulse signal that is output from the pulse generator 101 (see FIG. 3). FIG. 4 shows an output signal of the pulse transmission position adjuster 102. The arrows shown in the figure indicate the timing of a DA conversion sampling dock.

The pulse positions of a pulse signal (generated pulses) that is input to the pulse transmission position adjuster 102 are arranged at regular intervals. Every time a generated pulse is received, the pulse transmission position adjuster 102 delays it by α seconds which is a time adjustment amount. It is not necessary to delay the first-received pulse. Therefore, the pulse transmission position adjuster 102 outputs the first-received pulse without delaying it.

As shown in FIG. 4, the first pulse of a pulse signal to be transmitted is considered a reference. The second pulse is given a delay of α seconds for the pulse repetition interval. The delay α seconds is set so as to correspond to one sample of the DA conversion of the DA converter 103 (i.e., one dock pulse of the DA conversion sampling clock; in the illustrated example, 1/N (ns)).

Therefore, in the illustrated example, a delay corresponding to one sample is given. Since the delay of α seconds is given for the pulse repetition interval, the interval between the first pulse and the second pulse is equal to 1 µs+α seconds. The delay α seconds is not limited to the time corresponding to one sample of the DA conversion and may be, for example, an integer multiple of the sampling interval of the DA conversion.

The third pulse is given a delay of 2α seconds, which, in this embodiment, corresponds to two samples of the DA conversion. The interval between the first pulse and the third pulse is equal to 1 µs+1 µs+2α seconds. The interval between the second pulse and the third pulse is equal to 1 µs+α seconds.

The fourth pulse is given a delay of 3α seconds, which, in this embodiment, corresponds to three samples of the DA conversion. That is, the fourth pulse is transmitted after a lapse of an interval of 1 µs+1 µs+1 µs+3α seconds from the transmission of the first pulse. The interval between the third pulse and the fourth pulse is equal to 1 µs+α seconds.

Like the first pulse, the fifth pulse is not given a delay, that is, it is output without being delayed.

The same processing is repeated for the ensuing pulses.

In this embodiment, since N is set equal to 4 (example value), the delay operation involving four pulses is performed repeatedly. The set of four pulses constitutes one pattern of the transmission signal. Now, give numbers i=0, 1, 2, 3, ..., m to received pulses; then, received pulses whose numbers i divided by N have a remainder 0 are not given a delay. The delay operation is performed repeatedly in this manner.

The pulse transmission position adjuster 102 outputs a pulse signal in which the transmission timing of pulses is shifted by delaying them according to the above-described rule.

Although the above description is directed to the method how the pulse transmission position adjuster 102 delays the transmission timing of each pulse of a pulse signal, a control may be made in such a direction as to advance the transmission timing (decrease the delay) of each pulse. This is realized by constructing the pulse generator 101 so that it has the functions of a signal generator and a transmission signal position adjuster and controls a generated pulse sequence so to generate, in advance, a pulse signal in which the transmission timing is advanced on a pulse-by-pulse basis.

Figure 5:
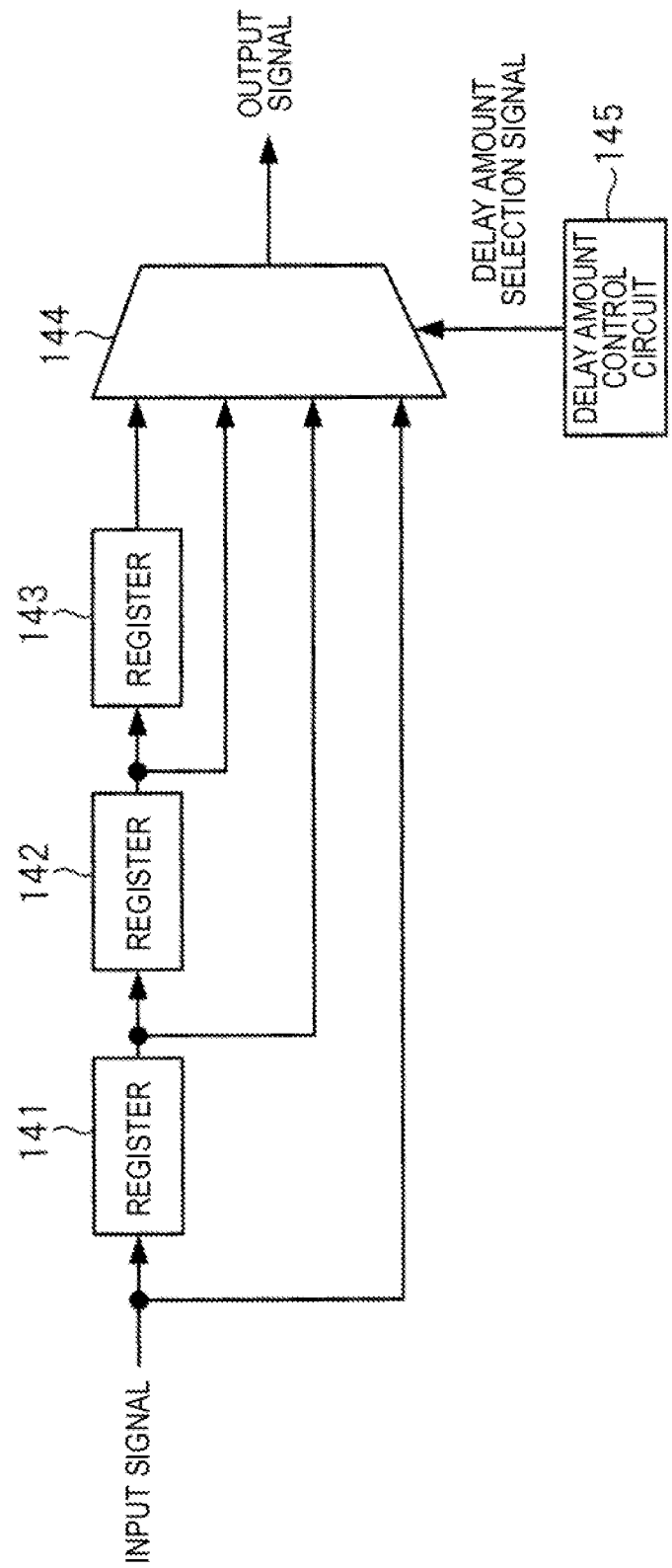
FIG. 5 is a block diagram showing an example configuration of the pulse transmission position adjuster.

FIG. 5 is a block diagram showing an example configuration of the pulse transmission position adjuster 102. FIG. 5 shows a specific example configuration of the pulse transmission position adjuster 102. The pulse transmission position adjuster 102 has three registers 141, 142, and 143, a selection circuit 144, and a delay amount control circuit 145.

The first register 141 gives an input pulse signal a delay corresponding to one operation clock pulse. The output of the first register 141 is input to the second register 142 and the selection circuit 144.

The second register 142 gives the output signal of the first register 141 a delay corresponding to one operation clock pulse. The output of the second register 142 is input to the third register 143 and the selection circuit 144.

The third register 143 gives the output signal of the second register 142 a delay corresponding to one operation clock pulse. The output of the third register 143 is input to the selection circuit 144.

The selection circuit 144 selects, as an output signal, one of the four signals, that is, the input signal, the output signal of the first register 141, the output signal of the second register 142, and the output signal of the third register 143, according to a delay amount selection signal that is output from the delay amount control circuit 145. The selection circuit 144 outputs the selected signal as an output signal.

The delay amount control circuit 145 controls the delay amount (time adjustment amount) to be given to the input signal. In doing so, the delay amount control circuit 145 outputs, to the selection circuit 144, the delay amount selection signal for selection of an output from the four inputs of the selection circuit 144. The delay amount control method of the delay amount control circuit 145 is the same as explained in the description of the operation of the pulse transmission position adjuster 102 with reference to FIG. 4. That is, the delay amount control circuit 145 controls the delay amount so that a delay of a seconds is added on a pulse-by-pulse basis with a prescribed number of (in this embodiment, four) pulses as a unit.

Figure 6:
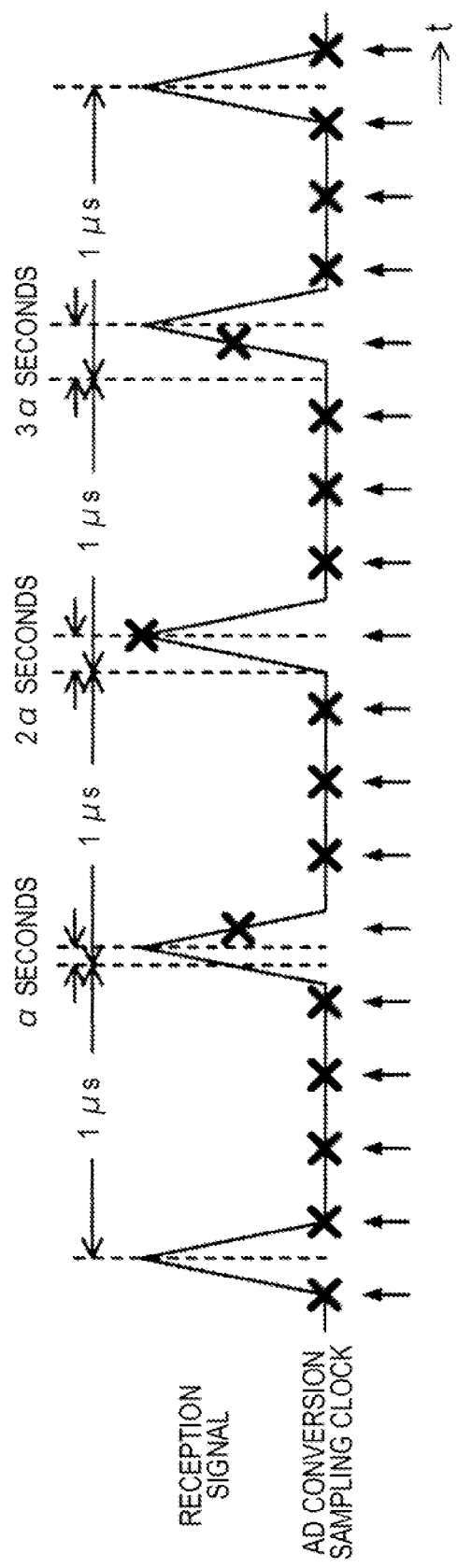
FIG. 6 is an operation explanation diagram schematically illustrating how an AD converter used in the first embodiment operates in sampling a reception signal.

FIG. 6 is an operation explanation diagram schematically illustrating how the AD converter 114 used in the first embodiment operates in sampling a reception signal. In FIG. 6, marks "x" indicate sampling points where a reception signal (pulse signal) is sampled according to the timing indicated by the AD conversion sampling dock. FIG. 6 shows a reception signal, received by the radar device, of reflection waves reflected from a reflective object when a pulse signal is transmitted from the radar device in the use environment of the radar device shown in FIG. 2.

In this case, as shown in FIG. 2, one object is assumed as the reflective object. It is assumed that the object is stationary. Even in the case of a moving object, the embodiment is effective as long as the object can be regarded as stationary during the pulse repetition interval. Where the object can be regarded as stationary, a path taken from transmission to reception does not vary between pulses.

A numerical example of a case that the object is moving will be described below. Assume that the object is a car that is moving at 100 km/h. The distance that this car covers in 10 μs which is a period when a pulse is transmitted 10 times repeatedly is about 277 μm. More specifically, the speed 100 km/h is (100×1,000) m÷3,600 s=27.7 m/s. Therefore, the movement distance per 1 μs is 27.7÷10$^6$=27.7 μm. Thus, the car moves 277 μm in 10 μs. Therefore, the car that is moving at 100 km/h can be well regarded stationary.

When the reflective object is stationary or can be regarded stationary because of a very short time concerned, the interval between received pulses remain the same as that of transmitted pulses. Therefore, when the pulse transmission position is delayed for each pulse of a transmission signal in the manner shown in FIG. 4, a reception signal is received in which the delay time of each pulse is conserved.

Assume that the positional relationship between the reception signal and the AD conversion sampling dock is as shown in FIG. 6.

The sampling clock that is used in AD-converting a reception signal has a lower rate than the sampling clock that is used in DA-converting a transmission signal. In this embodiment, the rate of the AD conversion sampling clock is set at ¼ of that of the DA conversion sampling clock. The ratio of the rate of the AD conversion sampling clock to that of the DA conversion sampling clock is not limited to ¼; it suffices that the rate of the DA conversion sampling clock be higher than that of the AD conversion sampling clock.

With the positional relationship between the reception signal and the sampling clock shown in FIG. 6, it is difficult to detect the first-received pulse of the reception signal.

Since the second-received pulse was transmitted at a position that was delayed by α seconds from the end of the pulse repetition interval (1 μs), it is received after a lapse of 1 μs+α seconds from the reception of the first pulse. Therefore, in the example of FIG. 6, the positional relationship between the reception signal and the AD conversion sampling dock is shifted by α seconds. As a result, the reception signal is sampled with timing that is different from the timing of the first pulse, that is, with timing having a delay of α seconds.

Since the third-received pulse was transmitted at a position that was delayed by 2α seconds from the end of the pulse repetition interval, it is received after a lapse of 1 μs+α seconds from the reception of the second pulse. Therefore, in the example of FIG. 6, the positional relationship between the reception signal and the AD conversion sampling clock is shifted by 2α seconds. As a result, the reception signal is sampled with timing that is different from the timing of the first pulse and the timing of the second pulse, that is, with timing having a delay of 2α seconds.

Since the fourth-received pulse was transmitted at a position that was delayed by 3α seconds from the end of the pulse repetition interval, it is received after a lapse of 1 μs+α seconds from the reception of the third pulse. Therefore, in the example of FIG. 6, the positional relationship between the reception signal and the AD conversion sampling clock is shifted by 3α seconds. As a result, the reception signal is sampled with timing that is different from the timing of the first pulse, the timing of the second pulse, and the timing of the third pulse, that is, with timing having a delay of 3α seconds.

Since the fifth-received pulse was transmitted without being delayed, it is received with the same timing as the first pulse. Therefore, the reception signal is sampled with the same timing as the first pulse.

As described above, since the transmission side transmits a transmission signal while varying its pulse transmission position, the reception side can AD-convert a reception signal while varying the timing of sampling it for each of repetitive transmission pulses. Pseudo oversampling (in this example, oversampling whose rate is four times the rate of the AD conversion sampling dock, that is, four times the rate corresponding to the pulse width) is realized by combining together sampled values of a reception signal that are sampled with different pieces of timing.

The distance detector 115 receives digital values obtained by sampling the reception signal with the AD converter 114, and recognizes positional relationships between the sampled data and the respective pulses according to a pulse transmission position signal that is output from the pulse transmission position adjuster 102. Then, the distance detector 115 generates a reception signal as sampled at an interval that is equal to the delay time between the pulses (in the illustrated example, α seconds), that is, at a time interval that is equivalent to the interval of the DA conversion sampling clock.

In doing so, the distance detector 115 rearranges and combines together sampling-point-shifted reception signal values for each pulse according to pieces of information of the pulse position and the sampling positions of each pulse (see FIG. 6), and thereby generates a digital signal that is equivalent to a signal as obtained by sampling with a short interval that is equal to the shift amount.

A digital signal is generated by pseudo oversampling by rearranging sampled values of the reception signal for each set of plural (in the above example, four) pulses that constitute one pattern of delays having the increment of α seconds that were given to the transmission signal.

As described above, a pseudo-oversampled signal can be generated by rearranging values of a reception signal corresponding to a transmission signal that was transmitted while the pulse position was varied, according to pulse transmission positions and sampling positions. That is, oversampling can be performed in such a manner that the time axis is extended by the time corresponding to repetitive transmission pulses of one pattern whose transmission positions are shifted from each other by the prescribed amount.

Pseudo oversampling is realized by performing the above operation in such a manner as to vary the pulse position of the transmission signal in units of a time that is shorter than the AD conversion sampling interval.

With the above-described configuration of the embodiment, oversampling can be realized without increasing the sampling frequency of the AD conversion circuit.

The separation resolution of a pulse radar device is determined by the pulse width of a transmission signal. Therefore, to increase the separation resolution, it is necessary to narrow the pulse width. However, to narrow the pulse width, it is necessary to increase the sampling frequency of the AD conversion circuit. Since the sampling frequency of the AD conversion circuit has a device-related limit, in a practical sense it is difficult to perform AD conversion at a sampling frequency of several gigahertz.

In contrast, with the configuration of the embodiment, sampling having a resolution that is higher than the resolution of the sampling frequency of the AD conversion circuit can be realized. Thus, a higher separation resolution can be realized using a signal having a narrower pulse width.

In general, because of their configurations, DA conversion circuits operate faster than AD conversion circuits. The configuration of the embodiment utilizes this feature. Thus, the embodiment is different from approaches that complicate the circuit such as a method in which an analog circuit performs timing adjustments on a sampling clock of an AD conversion circuit and a method in which plural AD conversion circuits are arranged parallel and pulses of a sampling clock of one AD conversion circuit are shifted.

As such, the embodiment can simplify the circuit, reduce the power consumption, and reduce the cost because pulse positions of a transmission signal are controlled digitally using the DA conversion circuit which operates faster than the AD conversion circuit.

Embodiment 2

Where pseudo oversampling is performed by transmitting a pulse of a pulse signal repeatedly while shifting its transmission timing, it is necessary to repeat transmission of pulses of an oversampling number and hence a measurement takes time. Furthermore, a measurement requires more time as the ratio of the transmission timing shift time (time adjustment amount) to the AD conversion sampling interval is set smaller.

In view of the above, in a second embodiment, the pulse width and the pulse positions of a pulse signal to be transmitted are changed according to a measurement environment of a radar device. This makes it possible to change the oversampling number according to a measurement environment.

In the case of a user environment of a radar device in which not many fixed reflective objects exist, the radar separation resolution is not required to be very high. That is, in an environment with a small number of reflection wave signals, it is not always necessary to use a pulse signal having a narrow pulse width. In this case, the AD conversion sampling interval may be long and the frequency of an AD conversion sampling clock may be low. Therefore, by changing the pulse width according to a measurement environment, the pseudo oversampling number can be reduced and hence the measurement time can be shortened.

FIG. 7 is a block diagram showing the configuration of a radar device according to the second embodiment of the invention, which is obtained by changing part of the configuration of the radar device according to the first embodiment of the invention. Items that are different than in the first embodiment will mainly be described and the same items as in the first embodiment will not be described.

A transmitter of the radar device is equipped with a variable width pulse generator 201, a pulse transmission position adjuster 202, a DA converter 103, a sampling dock generator 104, a multiplier 105, a transmission mixer 106, a local signal generator 107, an amplifier 108, and an antenna 109. A receiver of the radar device is equipped with an antenna 111, an amplifier 112, a reception mixer 113, an AD converter 114, a distance detector 115, and a measurement environment detector 216.

The radar device according to the second embodiment is different in configuration from that according to the first embodiment in being equipped with the measurement environment detector 216 and the variable width pulse generator 201 which replaces the pulse generator. Furthermore, the pulse transmission position adjuster 202 operates differently than the pulse transmission position adjuster used in the first embodiment.

The variable width pulse generator 201, which is an example block for realizing the function of the signal generator, determines a pulse width of a pulse signal to be transmitted according to measurement environment information that is output from the measurement environment detector 216. A pulse width determining method will be described later. The variable width pulse generator 201 generates and outputs a pulse, having the determined pulse width, of a pulse signal repeatedly at a constant time interval. Furthermore, the variable width pulse generator 201 also outputs pulse width information to the pulse transmission position adjuster 202.

The pulse transmission position adjuster 202 receives the pulse signal and the pulse width information that are output from the variable width pulse generator 201. The pulse transmission position adjuster 202 basically operates in the same manner as the pulse transmission position adjuster 102 used in the first embodiment, and is different from the latter in changing the delay time α of each pulse according to the pulse width of a pulse signal to be transmitted. The pulse transmission position adjuster 202 outputs, to the DA converter 103, a pulse signal whose delay amount of each pulse has been controlled according to the pulse width.

The measurement environment detector 216 receives a reception signal as converted into digital values that is output from the AD converter 114. The measurement environment detector 216 extracts, from the received reception signal, as measurement environment information, feature information which relates to the number of reflective objects existing in a measurement environment. Then, the measurement environment detector 216 outputs the measurement environment information to the variable width pulse generator 201.

The feature information relating to the number of existing reflective objects is the number of reflection wave signals, for example. In this case, the measurement environment detector 216 counts reflection wave signals that exceed a preset threshold value and employs the number of such reflection wave signals as measurement environment information. For another example, a delay spread may be employed as feature information relating to the number of existing reflective objects. A measurement environment judging method will be described later.

Figure 8A:
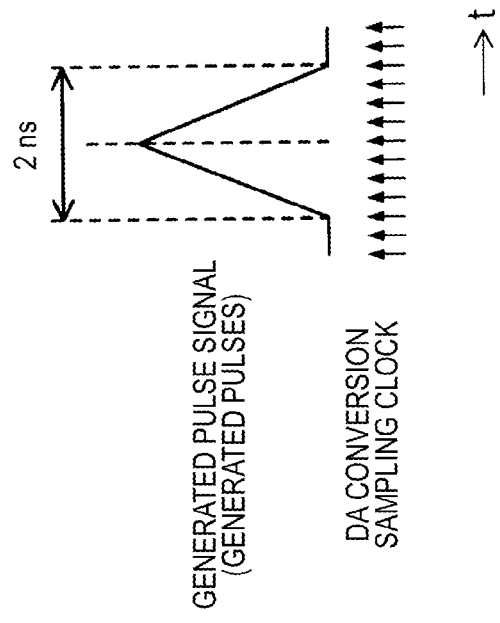
FIGS. 8(A) and 8(B) are operation explanation diagrams showing example pulse signals (generated pulses) each of which is output from a variable width pulse generator used in the second embodiment.
Figure 8B:
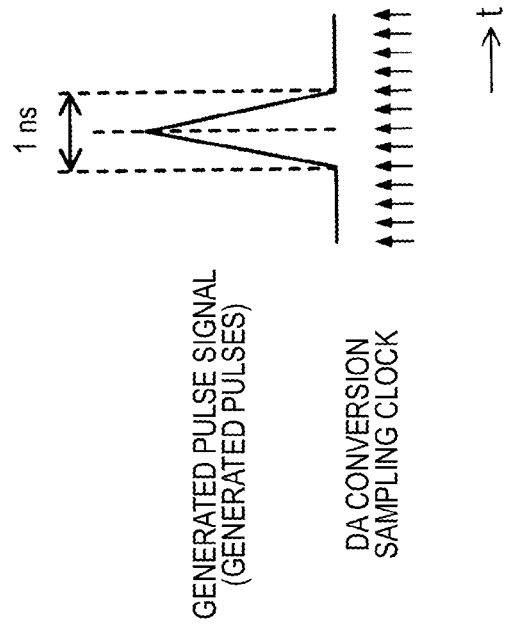

FIGS. 8(A) and 8(B) are operation explanation diagrams showing example pulse signals (generated pulses) each of which is output from the variable width pulse generator 201 used the second embodiment. The variable width pulse generator 201 generates and outputs a variable width pulse signal according to measurement environment information. FIG. 8(A) shows an example waveform in which the pulse width is set at 1 ns, and FIG. 8(A) shows an example waveform in which the pulse width is set at 2 ns.

In the figures, arrows indicate timing of a sampling dock of the DA converter 103 (DA conversion sampling clock). Where sampling is performed using a 4-GHz sampling clock, the pulse signal waveform and the DA conversion sampling clock have a relationship shown in FIG. 8(A) or 8(B). That is, the pulse width of 1 ns corresponds to four samples and the pulse width of 2 ns corresponds to eight samples. That is, as in the first embodiment, let us use the expression "the interval of the DA conversion sampling clock is 1/N of the pulse width." Then, in the case of FIG. 8(A), N is equal to 4 as in the operation described in the first embodiment. In the case of FIG. 8(B), N is equal to 8.

In the illustrated example, if judging that the number of existing reflective objects is larger than or equal to a prescribed value on the basis of measurement environment information, the variable width pulse generator 201 generates a pulse signal having the narrower pulse width 1 ns (first signal width; see FIG. 8(A)). If judging that the number of existing reflective objects is smaller than the prescribed value, the variable width pulse generator 201 generates a pulse signal having the broader pulse width 2 ns (second signal width which is broader than the first signal width; see FIG. 8(B)).

FIGS. 9(A) and 9(B) are operation explanation diagrams showing example pulse signals (transmission pulses) each of which is output from the pulse transmission position adjuster 202 used the second embodiment. The pulse transmission position adjuster 202 varies the pulse positions of a received pulse signal and thereby adjusts the transmission timing (pulse transmission positions) of a pulse signal. The received pulse signal is the pulse signal that is output from the variable width pulse generator 201 (see FIGS. 8(A) and 8(B)). FIGS. 9(A) and 9(B) show output signals of the pulse transmission position adjuster 202 which correspond to the pulse signals shown in FIGS. 8(A) and 8(B), respectively.

FIG. 9(A) shows a waveform of a case that a pulse signal having a pulse width 1 ns is received, and FIG. 9(B) shows a waveform of a case that a pulse signal having a pulse width 2 ns is received. In the figures, arrows indicate timing of a DA conversion sampling clock. It is assumed that the ratio M of the rate of the sampling clock of the DA converter 103 to that of the sampling clock of the AD converter 114 is equal to 4 (M=4).

FIG. 9(A) illustrates an example pulse position control method in which and the delay amount is set to $\alpha_1=1/M$ (ns) (1/M times the pulse width. M=4) in the case where the pulse width is equal to 1 ns. This operation is same as in the first embodiment.

FIG. 9(B) illustrates an example pulse position control method in which and the delay amount is set to $\alpha_2=2/M$ (ns) (1/M times the pulse width, M=4) in the case where the pulse width is equal to 2 ns. In this manner, when the pulse width is increased, the pulse position control method is changed so as to increase the delay amount according to the new pulse width. That is, a control is made so that the number of times each pulse is sampled by pseudo oversampling is kept the same irrespective of the pulse width. The number N is equal to 4 and 8 in the examples of FIGS. 9(A) and 9(B), respectively. Therefore, a control is made so that N is made equal to 4 also in the example of FIG. 9(B).

The first-received pulse is output without being delayed.

The second pulse is delayed by $\alpha_2$ seconds ($\alpha_2=2/M$ (ns)) for the pulse repetition interval. This delay amount corresponds to two DA conversion samples of the DA converter 103 (i.e., two clock pulses of the DA conversion sampling clock). The interval between the first pulse and the second pulse is equal to 1 μs+$\alpha_2$ seconds. Therefore, the second pulse is output after a lapse of 1 μs+$\alpha_2$ seconds after the output of the first pulse.

The third pulse is output without being delayed.

The fourth pulse is delayed by $\alpha_2$ seconds ($\alpha_2=2/M$ (ns)). This delay amount corresponds to two DA conversion samples. The interval between the third pulse and the fourth pulse is equal to 1 μs+α seconds. Therefore, the fourth pulse is output after a lapse of 1 μs+$\alpha_2$ seconds after the output of the third pulse.

The same operation as described above is repeated for the ensuing pulses.

As described above, the pulse position range depends on the ratio M of the rate of the AD conversion sampling clock to that of the DA conversion sampling clock. Possible patterns of pulse positions are determined by what factor the rate of the DA conversion sampling clock is higher than that of the AD conversion sampling clock. In the above-described examples, since M is equal to 4, there are the pattern of a factor 4 and the pattern of a factor 2. The number M is not limited to 4 and is only required to satisfy a relationship M≥2.

In the example of FIG. 9(A), the pulse position pattern is repeated every four pulses. In the example of FIG. 9(B), the pulse position pattern is repeated every two pulses. Therefore, to realize pseudo oversampling, only two pulses are necessary in the example of FIG. 9(B) whereas four pulses are necessary in the example of FIG. 9(A).

Thus, the time that is necessary for pseudo oversampling depends on the pulse position control method: the time that is necessary for the processing becomes shorter as the number of pulses that constitute a pulse position pattern decreases. As the delay amount of a pulse position control is increased, the number of pulses that constitute a pattern decreases and the time that is necessary for pseudo oversampling can be shortened.

Although in the above description the number of pulse widths of a pulse signal to be generated by the variable width pulse generator 201 is two, it may be larger than two. The pulse width may be determined taking into consideration the reflection wave separation resolution and the time that is necessary for pseudo oversampling.

Under a condition that the frequencies of the AD conversion sampling clock and the DA conversion sampling clock are fixed, the number of pulses that are necessary for pseudo oversampling can be made smaller as the pulse width increases. If sampling is performed in such a manner that the number of samples per pulse is kept the same, the number of pulses that are necessary for pseudo oversampling can be decreased as the pulse width is increased.

Figure 10:
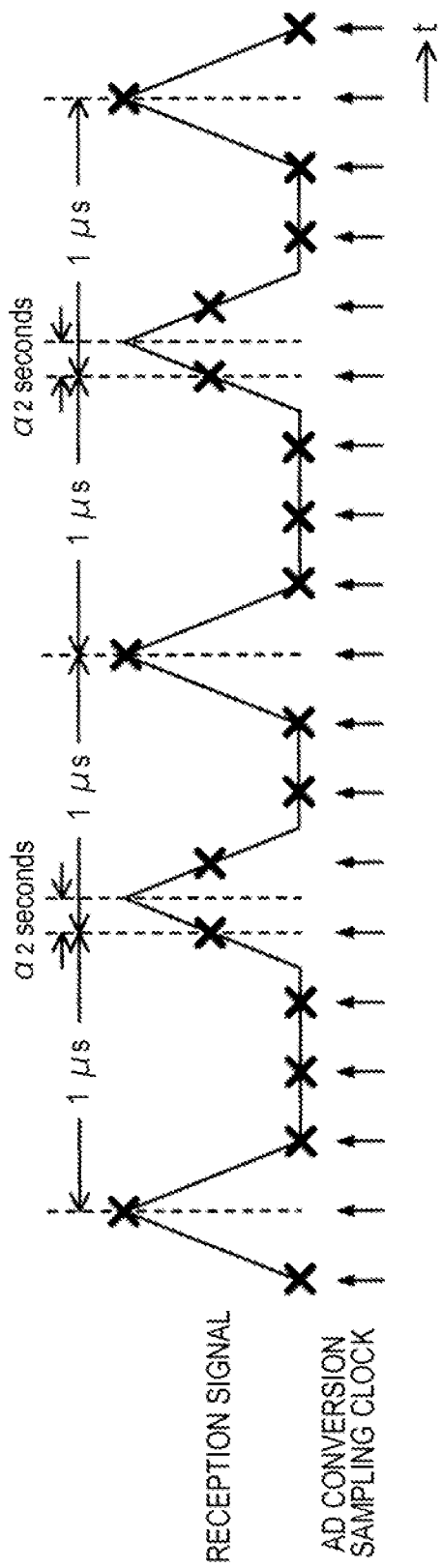
FIG. 10 is an operation explanation diagram schematically illustrating how an AD converter used in the second embodiment operates in sampling a reception signal.

FIG. 10 is an operation explanation diagram schematically illustrating how the AD converter 114 used in the second embodiment operates in sampling a reception signal. In FIG. 10, marks "x" indicate sampling points where a reception signal (pulse signal) is sampled according to the timing indicated by the AD conversion sampling clock. FIG. 10 shows a reception signal that received when the pulse signal shown in FIG. 9(B) is transmitted. The same sampling operation as described in the first embodiment with reference to FIG. 6 is performed when the pulse signal shown in FIG. 9(A) is transmitted.

The same radar device use environment as shown in FIG. 2 (first embodiment) is assumed. FIG. 10 shows a reception signal, received by the radar device, of reflection waves reflected from the reflective object when a pulse signal is transmitted from the radar device in an environment in which one reflective object exists in a subject space of the radar device.

In this case, it is assumed that the object is stationary or can be regarded as stationary during the pulse repetition interval. Where the object can be regarded as stationary, a path taken from transmission to reception does not vary between pulses.

It is assumed that the first-received pulse of the reception signal is received with a positional relationship shown in FIG. 10. In this case, because of the increased pulse width, no difficult-to-detect situation occurs unlike in the case of FIG. 6 (first embodiment).

Since the second-received pulse was transmitted at a position that was delayed from the end of the pulse repetition interval (1 μs) by $α_2$ seconds, it is received with the same delay time of $α_2$ seconds. Therefore, the second pulse is received after a lapse of 1 μs+$α_2$ seconds from the reception of the first pulse. Therefore, the positional relationship between the reception signal and the AD conversion sampling clock is shifted by $α_2$ seconds. As a result of this delay, the reception signal is sampled with timing that is different from the timing of the first pulse, that is, with timing having a delay of α seconds.

Since the third-received pulse was not delayed by $α_2$ s like the first pulse when it was transmitted, the pulse interval returns to 1 μs. At this time, the reception signal is sampled with the same timing as the first pulse.

Since the fourth-received pulse was delayed by $α_2$ s like the first pulse when it was transmitted, it is received after a lapse of 1 μs+$α_2$ s from the reception of the third pulse. Therefore, the reception signal is sampled with timing that is different from the timing of the first pulse and the third pulse. That is, as in the case of the second pulse, the reception signal is sampled with timing having a delay of $α_2$ s. The ensuing pulses are received in such a manner that the same relationship as between the first pulse and the second pulse appears repeatedly.

As described above, since the transmission side transmits a transmission signal while varying its pulse transmission position, the reception side can sample a reception signal with different timing for each of repetitive transmission pulses because the AD conversion timing is shifted. In this case, pseudo oversampling (in this example, oversampling whose rate is two times the rate of the AD conversion sampling clock, that is, four times the rate corresponding to the pulse width) is realized by combining together sampled values in the first pulse interval and sampled values in the second pulse interval.

Figure 11:
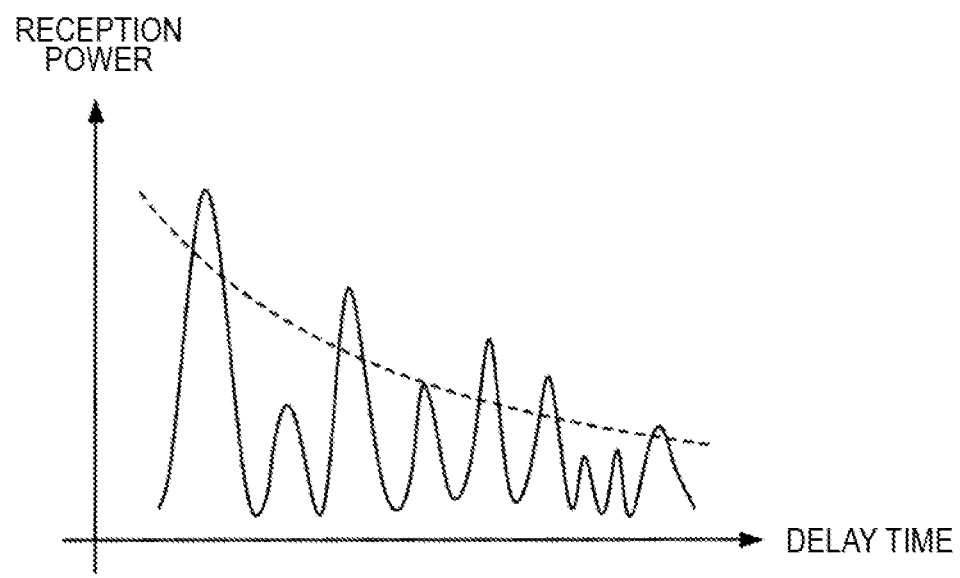
FIG. 11 illustrates a method for judging a measurement environment in a measurement environment detector 216 used in the second embodiment.

FIG. 11 illustrates a method for judging a measurement environment in the measurement environment detector 216 used in the second embodiment. FIG. 11 shows an example reception signal waveform in which the vertical axis represents the reception power and the horizontal axis represents the delay time from the transmission of a pulse. In the figure, a solid line represents a reception signal and a broken line indicates a threshold for judgment as to whether reflection waves exist or not.

This is an example in which a measurement environment is judged using the number of reflection wave signals. The threshold value is varied temporally. As shown in the figure, a control is made so that the threshold value decreases as the delay time increases. The reason why the threshold value is controlled in this manner is that the signal power decreases according to the transmission distance of radio waves and hence the reception power decreases as the delay time from transmission of a pulse increases. Where a reception signal is subjected to an AGC control, it is appropriate to set the threshold value according to the AGC control level.

The measurement environment detector 216 counts the number of times the peak value of a reception signal exceeds the threshold value, and employs it as the number of reflection wave signals. As the number of reflection wave signals increases, the probability that many reflection wave signals are received at the same delay time increases and hence a higher separation resolution is required. Conversely, as the number of reflection wave signals decreases, the probability that plural reflection wave signals are received at the same delay time decreases and hence the required separation resolution decreases.

The variable width pulse generator 201 determines a pulse width according to measurement environment information that is characterized by the number of existing reflecting objects. When the number of reflection wave signals is large, a narrow pulse width is set because a high separation resolution is required. When the number of reflection wave signals is small, a broad pulse width is set because a high separation resolution is not required.

Although the above-described measurement environment judging method is such that a measurement environment is judged according to the number of reflection wave signals, the measurement environment judging method is not limited to it. A measurement environment may be judged according to a delay spread. The delay spread is statistical data indicating the degree of spreading of reflection waves in the delay time direction, and is described in the following Non-patent document 1:

[Non-patent document 1] Mitsuo Yokoyama, "Basics of Mobile Communication Technology," Chapter 3, pp. 68-70, The Nikkan Kogyo Shimbun, Ltd.

The delay spread represents a delay time spread of incoming waves. A large delay spread means that many reflective objects exist in a wide range. Conversely, a small delay spread means that only a small number of reflective objects exist. Therefore, when the delay spread has a large value, the pulse width is set small because it is necessary to separate incoming wave signals coming from many reflective objects. Conversely, when the delay spread has a small value, the pulse width is set broad because the number of reflective objects is small and hence high separation performance is not required.

With the above-described configuration of the embodiment, the pulse width can be varied according to a measurement environment (the number reflective object, a delay spread, or the like) and the oversampling number can be adjusted according to the pulse width. This makes it possible to detect an object and perform a distance measurement or the like with accuracy that is suitable for a measurement environment.

Furthermore, the measurement time with pseudo oversampling can be reduced by adjusting the pseudo oversampling number by varying the pulse width according to a measurement environment. Still further, as in the first embodiment, since sampling whose resolution is higher than a resolution corresponding to the sampling frequency of the AD conversion circuit can realized, whereby the separation resolution can be increased and high-accuracy radar measurements are enabled.

Embodiment 3

Figure 12:
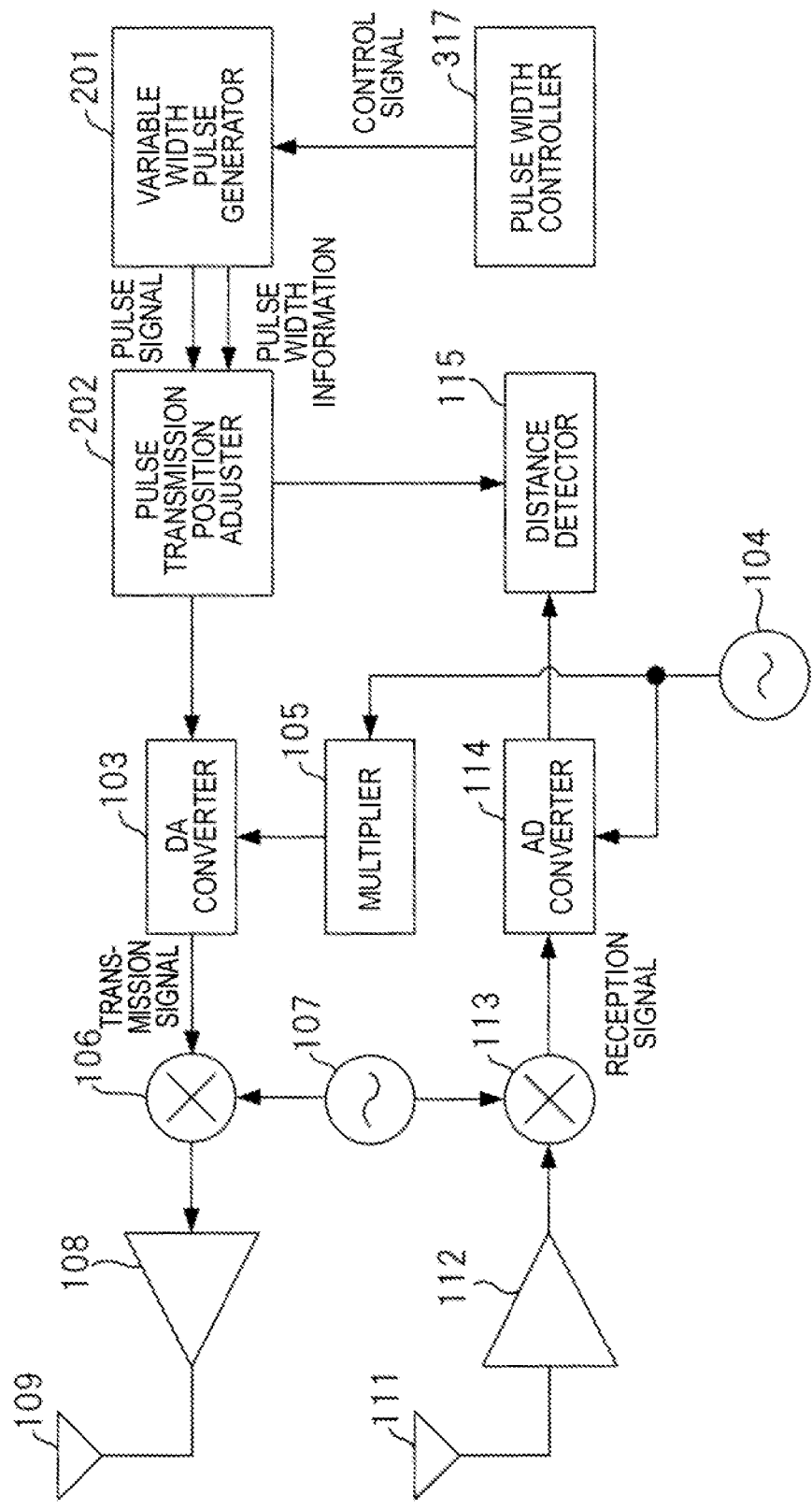
FIG. 12 is a block diagram showing the configuration of a radar device according to a third embodiment of the invention.

FIG. 12 is a block diagram showing the configuration of a radar device according to a third embodiment of the invention, which is obtained by changing part of the configuration of the radar device according to the second embodiment of the invention. Items that are different than in the second embodiment will mainly be described and the same items as in the second embodiment will not be described.

The radar device according to the third embodiment is different in configuration from that according to the second embodiment in being equipped with a pulse width controller 317 in place of the measurement environment detector 216.

When a prescribed condition is satisfied, the pulse width controller 317 controls a pulse width varying operation of the variable width pulse generator 201 by supplying a control signal to the variable width pulse generator 201. The variable width pulse generator 201 determines a pulse width of a pulse signal to be transmitted according to the control signal supplied from the pulse width controller 317, and generates and outputs a pulse having the determined pulse width repeatedly at a constant interval. The pulse width varying operation of the variable width pulse generator 201 and the pulse width transmission position control method of the pulse transmission position adjuster 202 are the same as in the second embodiment.

For example, the prescribed condition that should be satisfied to cause the pulse width controller 317 to change the pulse width is reception of an external control instruction. In this case, the pulse width controller 317 is caused to output a control signal for determination of a pulse width by giving a control instruction to it as a setting manipulation or the like in making initial setting according to a setting location of the radar device. Where the number of existing reflective objects can be assumed to some extent, this kinds of pulse width varying method is possible. For example, the pulse width setting is varied so that the pulse width is set narrow in urban areas and broad in the suburbs.

Another prescribed condition that should be satisfied to change the pulse width is a condition that is based on time information such as daytime or night. In this case, the pulse width controller 317 outputs a control signal for pulse width determination when given a control factor in the form of time information of a timer. For example, the pulse width setting is varied so that the pulse width is set narrow during the daytime and broad during the night.

Where a sensor is installed in an urban area, the traffic of humans and automobiles would be heavy during the daytime and light during the night. During the daytime when it is highly probable that more objects exist in the sensor measurement area than in the night, the pulse width is set narrow to increase the separation resolution. This enables, for example, a measure that during the night the pulse width is set broad to lower the power consumption.

A further prescribed condition is a one that is based on measurement environment detection information such as measurement environment information generated by the measurement environment detector 216 used in the second embodiment (see FIG. 7). In this case, the pulse width controller 317 outputs a control signal for pulse width determination when given a control factor in the form of detection information such as measurement environment information. For example, the pulse width setting is varied so that the pulse width is set narrow in an environment in which the number of objects is judged large and broad in an environment in which the number of objects is judged small.

As described above, according to the third embodiment, the pulse width can be varied according to a measurement condition and the pseudo oversampling number can be adjusted according to the pulse width. This provides the same advantages as in the second embodiment.

Embodiment 4

Figure 13:
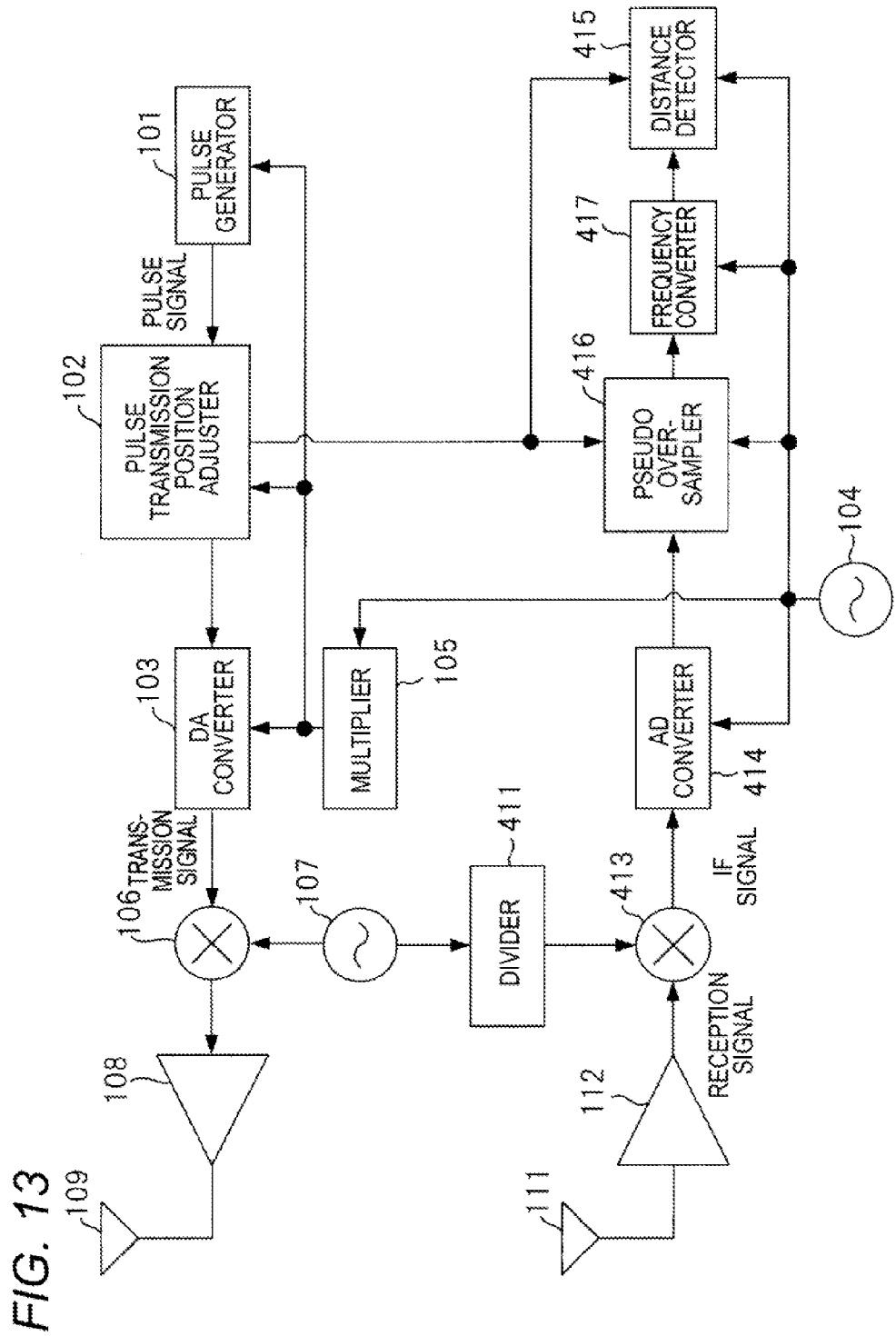
FIG. 13 is a block diagram showing the configuration of a radar device according to a fourth embodiment of the invention.

FIG. 13 is a block diagram showing the configuration of a radar device according to a fourth embodiment of the invention, which is obtained by changing part of the configuration of the radar device according to the first embodiment of the invention. Items that are different than in the first embodiment will mainly be described and the same items as in the first embodiment will not be described.

The fourth embodiment is different from the first embodiment in that an RF reception signal received by the reception antenna is converted into an IF (Intermediate Frequency) signal by an analog circuit and the IF signal is IF-sampled by the AD conversion circuit.

The radar device according to the fourth embodiment is equipped with a divider 411 and a frequency converter 417 in addition to the configuration of the first embodiment. And the function of the distance detector 115 used in the first embodiment is implemented in a separated manner by a pseudo oversampler 416 and a distance detector 415. Digital circuits of the pseudo oversampler 416, the frequency converter 417, and the distance detector 415 operate according to a clock signal that is output from the sampling clock generator 104.

The local signal generator 107 is connected to the transmission mixer 106 and the divider 411, and inputs a generated local signal to the transmission mixer 106 and the divider 411.

The divider 411 receives an RF-frequency local signal (carrier signal) from the local signal generator 107. The divider 411, which has a frequency divider, divides the frequency of an input signal and thereby outputs a resulting frequency-divided IF local signal. The frequency of the IF local signal is set equal to a sampling intermediate frequency of an AD converter 414. The output signal of the divider 411 is input to a reception mixer 413.

The reception mixer 413 receives the IF local signal that is output from the divider 411 and a reception signal that is output from the amplifier 112. The reception mixer 413 mixes the IF local signal and the reception signal together through multiplication and thereby converts the RF-frequency reception signal into an IF signal. The IF reception signal (hereinafter referred to as an IF signal) is input to the AD converter 414.

The AD converter 414 receives the IF signal that is output from the reception mixer 413 and a sapling dock that is output from the sampling clock generator 104. Using the received sampling clock, the AD converter 414 converts the received IF signal into a digital signal by producing digital values by sampling the IF signal at the interval of the received sampling clock. The IF signal as converted into the digital signal is input to the pseudo oversampler 416.

The pseudo oversampler 416 receives the IF signal having the sampled digital values that is output from the AD converter 414, the sampling dock that is output from the sampling clock generator 104, and a pulse transmission position signal that is output from the pulse transmission position adjuster 102. The pseudo oversampler 416 pseudo-oversamples the received IF signal and outputs a pseudo-oversampled IF signal. That is, the pseudo oversampler 416 has the same pseudo oversampling function as the above-described distance detector 115 used in the first embodiment.

Although in the first embodiment the pseudo oversampling function is part of the function of the distance detector 115, in the fourth embodiment the pseudo oversampling function is separated from the distance detector 115 to form the independent function pseudo oversampler 416. As in the first embodiment, a pulse of a transmission signal is transmitted repeatedly while the pulse transmission position adjuster 102 shifts the transmission timing of a pulse signal (pulse transmission position) at an interval that is shorter than the IF signal sampling interval of the AD converter 414 of the receiver. The pseudo oversampler 416 performs pseudo oversampling using the sampling dock having a low frequency by rearranging sampled values of the IF signal produced by the AD converter 414 according to pulse positions indicated by the pulse transmission position signal.

The frequency converter 417 receives the pseudo-oversampled IF signal that is output from the pseudo oversampler 416 and the sampling clock that is output from the sampling clock generator 104. The frequency converter 417 converts the received IF signal into a baseband signal. The IF signal is converted into a baseband signal by multiplying it by a sine wave and a cosine wave whose frequency is equal to the center frequency of the IF signal. Multiplication results are in-phase and quadrate components of the baseband signal. The frequency converter 417 outputs the in-phase and quadrate components of the converted baseband signal.

The distance detector 415 receives the baseband signal that is output from the frequency converter 417, the sampling clock that is output from the sampling clock generator 104, and the pulse transmission position signal that is output from the pulse transmission position adjuster 102. The distance detector 415 detects a distance to the object using the baseband signal.

In the fourth embodiment, the pseudo oversampling function is separated from the distance detector 115 used in the first embodiment to form the independent function pseudo oversampler 416. Therefore, the distance detector 415 performs the function of the distance detector 115 used in the first embodiment excluding the pseudo oversampling function. That is, the distance detector 415 performs the function of calculating a time from transmission of a pulse to its reception using the baseband signal that is output from the frequency converter 417, and calculating a distance to an object.

Unlike in the first embodiment in which a baseband signal is sampled into a digital signal, in the fourth embodiment an IF signal is sampled into a digital signal (IF sampling). IF sampling is performed using a sampling clock whose frequency is higher than the frequency of a sampling dock used for sampling a baseband signal.

However, since pseudo oversampling is performed in the fourth embodiment, a frequency of a sampling clock that is used after the pseudo oversampling is determined so that the condition of the IF sampling is satisfied. That is, a frequency of a sampling dock used after the pseudo oversampling is determined so that the sampling theorem is satisfied in a frequency band of an IF signal that is input to the AD converter 414.

More specifically, a frequency of a sampling clock and a pseudo oversampling number are set so that a pseudo oversampling frequency which is the product of the sampling dock frequency and the pseudo oversampling number satisfies the sampling theorem in a frequency band of an IF signal. The sampling dock generator 104 generates and outputs a clock signal (sampling clock signal) that satisfies the above condition.

As is understood from the above-described operation, the pseudo oversampling makes it possible to perform sampling by AD conversion that uses a sampling clock whose frequency is lower than a frequency of ordinary IF sampling. In conventional IF sampling, AD conversion is performed using a higher sampling frequency than in sampling of a baseband signal. In contrast, in the radar device according to the fourth embodiment, by virtue of the pseudo oversampling, AD conversion can be performed using a sampling clock having a low frequency. That is, IF sampling is enabled which uses a sampling clock having a lower frequency than in the conventional case.

Furthermore, the use of a sampling clock having a low frequency makes it possible to set the bit width of the AD converter broader than in the case of using a sampling clock having a high frequency. Increase of the bit width of the AD converter permits broadening of the dynamic range of a signal to be sampled and hence enables increase of an object detectable distance range of the radar device. Still further, since a high sampling rate can be realized in a simulated manner, the reflective object separation resolution can be increased also in the configuration in which IF sampling is performed (refer to the first embodiment).

The present invention expects that those skilled in the art will make various changes and applications on the basis of the disclosure of the specification and known techniques without departing from the spirit and scope of the invention, and such changes and applications are included in the requested scope of protection. And constituent elements of the embodiments may be combined arbitrarily without departing from the spirit of the invention.

Although each of the above embodiments is such that the invention is implemented by hardware, the invention can also be implemented by software.

Each of the function blocks that were used for describing each embodiment is typically implemented as an LSI which is an integrated circuit. The function blocks may be implemented as one chips individually, or all or part of them may be implemented as a one chip. Although the term "LSI" is used above, other terms such as an IC, a system LSI, a super-LSI, and ultra-LSI may also be used depending on the degree of integration.

The manner of implementation as an integrated circuit is not limited to formation of an LSI and may be formation of a dedicated circuit or employment of a general-purpose processor. It is also possible to use an FPGA (field programmable gate array) which enables programming after manufacture of an LSI or a reconfigurable processor which enables reconfiguration of connections between and settings of circuit cells provided in an LSI.

Furthermore, if a new technology for manufacturing an integrated circuit to replace an LSI because of advancement of the semiconductor technologies or development of another technology derived from them, function blocks may naturally be integrated using that technology. Another possibility is application of biotechnology.

The present application is based on the Japanese Patent Application No. 2010-205420 filed on Sep. 14, 2010, the disclosure of which is incorporated herein by reference.

INDUSTRIAL APPLICABILITY

Providing the advantages that a digital signal can be acquired at an interval that is shorter than the sampling interval of an AD conversion circuit and the distance resolution of a radar device can thereby be increased without making the AD conversion circuit and its peripheral circuits complex in configuration, the invention is useful when applied to, for example, radar devices such as pulse radars which use a pulse signal as a transmission signal.

DESCRIPTION OF REFERENCE NUMERALS AND SIGNS

101: Pulse generator
102, 202: Pulse transmission position adjuster
103: DA converter
104: Sampling clock generator
105: Multiplier
106: Transmission mixer
107: Local signal generator
108, 112: Amplifier
109, 111: Antenna
113, 413: Reception mixer
114, 414: AD converter
115, 415: Distance detector
141, 142, 143, Register
144: Selection circuit
145: Delay amount control circuit
201: Variable width pulse generator
216: Measurement environment detector
317: Pulse width controller
411: Divider
416: Pseudo oversampler
417: Frequency converter

The invention claimed is:

1. A radar device comprising:
a pulse generator that generates a pulse sequence having a prescribed pulse width and pulse interval;
a transmission pulse position adjuster that outputs a transmission signal while adjusting positions of the pulse sequence on the time axis;
an RF transmitter that transmits the transmission signal to a measurement subject space in the form of radio waves;
an RF receiver that receives, from the measurement subject space, a reception signal including reflection waves reflected from an object in the measurement subject space;
an AD converter that converts the reception signal into a digital signal; and
an object detector that detects the object on the basis of the reception signal,
wherein
the transmission pulse position adjuster adjusts a transmission timing of each pulse of the pulse sequence using an amount of a transmission time adjustment that is shorter than a sampling interval of the AD converter.

2. The radar device according to claim 1, wherein the transmission pulse position adjuster outputs a transmission signal in which transmission positions of the each pulse of the pulse sequence are delayed or advanced using the amount of the transmission time adjustment, and the pulse sequence has one or more pulse groups, each of the one or more pulse groups ending when the transmission timing becomes equal to the timing of the original pulse sequence.

3. The radar device according to claim 2, wherein the object detector generates a reception signal from the digital signal which is rearranged the order of the pulse groups, a sampling interval which is equal to the adjusted transmission timing according to the amount of the transmission time adjustment of the each pulse.

4. The radar device according to claim 1, wherein the object detector generates a reception signal from the digital signal using a sampling interval which is equal to the adjusted transmission timing according to the amount of the transmission time adjustment of the each pulse.

5. The radar device according to claim 1, further comprising:
a measurement environment detector that detects a measurement environment of the reception signal,
wherein the pulse generator adjusts the pulse width to be generated, and generates a pulse sequence having a prescribed pulse width according to measurement environment information supplied from the measurement environment detector; and
wherein the transmission pulse position adjuster varies the amount of the time adjustment according to the pulse width.

6. The radar device according to claim 5, wherein the measurement environment detector outputs, as the measurement environment information, feature information relating to the number of reflective objects existing in the measurement environment.

7. The radar device according to claim 6, wherein the signal generator generates a pulse sequence having a first pulse width when judging that the number of existing reflective objects is larger than or equal to a prescribed value, and generates a pulse sequence having a second pulse width that is broader than the first pulse width when judging that the number of existing reflective objects is smaller than the prescribed value.

8. The radar device according to claim 7, wherein when the pulse width is equal to the second pulse width, the transmission pulse position adjuster sets the amount of time adjustment larger than when the pulse width is equal to the first pulse width.

9. The radar device according to claim 1, further comprising:
a pulse width controller that controls the pulse width,
wherein the pulse generator adjust the pulse width to be generated, and generates the pulse sequence having the prescribed pulse width according to a control signal supplied from the pulse width controller; and
wherein the transmission pulse position adjuster adjusts the amount of time adjustment according to the pulse width.

* * * * *